Patented Mar. 18, 1930

1,750,761

UNITED STATES PATENT OFFICE

OTTO V. MARTIN, OF SAND SPRING, OKLAHOMA, ASSIGNOR TO THE MARTIN-COLVIN CO., A CORPORATION OF ILLINOIS

METHOD OF INHIBITING CORROSIVE EFFECT OF BRINES TOWARD IRON AND STEEL

No Drawing.  Application filed October 26, 1927. Serial No. 228,983.

This invention relates to a process of inhibiting the corrosive effect of brines toward iron and steel.

It is generally well known that brines have a corrosive action toward iron and steel. The same is generally true of natural waters containing dissolved salts, such as sea water, and artificially prepared salt solutions. In the salt industry, to which my invention has especial reference, corrosion of the evaporating apparatus, pipes and the like necessitates frequent repairs and replacements. In many cases more expensive, non-corrodible metals have been substituted for iron in parts of the equipment. Corrosion has also always been a serious factor in the oil refining industry, where the small quantities of brine in the oils are responsible for much of the corrosion that occurs in stills and other refinery equipment.

Furthermore, in many parts of the country waters available for cooling or condensing purposes contain sufficient quantities of dissolved salts to seriously corrode iron and steel equipment used for such purposes.

It is therefore an object of this invention to provide a method of inhibiting the corrosive effect of brines, and in general waters containing dissolved salts, toward iron and steel to permit extensive use of these cheaper metals in equipment handling brines, or subjected to the action of normally corrosive waters and to prolong the useful life of such equipment.

Other and further important objects of this invention will become apparent from the following description and appended claims.

I have now found that the corrosive effect of brines and salt solutions in general toward iron and steel can be substantially inhibited by producing a magnesium hydroxide content in the brines and solutions in very slight excess of its solubility in such brines and solutions. If sufficient magnesium hydroxide be added to give a very slight excess, thereby resulting in some of the magnesium hydroxide remaining in suspension, the inhibiting effect is very marked.

This inhibiting effect is probably due to the fact that magnesium hydroxide acts to regulate the hydrogen ion concentration of the brines in such a manner as to produce a pH value at which the corrosive effect is minimized. In any event, I have found it possible, using magnesium hydroxide to operate equipment, such as described in my copending application, entitled "Process for the production of salts from brines and solutions", Serial No. 110,219, for long periods of time without serious corrosion, whereas without the addition of magnesium hydroxide to the brines, rapid and severe corrosion of the iron vessels and piping occurs within a short time.

It will, of course, be understood that my invention is not limited to the addition of magnesium hydroxide as such to brines, but includes any and all methods by which magnesium hydroxide is formed or created in the brines in excess of its solubility therein. Since the solubility of magnesium hydroxide in water is approximately only 0.0009 percent, it is only necessary to have present in the brines a very small amount of magnesium hydroxide, say less than 0.05 of 1 percent. In such small amounts, magnesium hydroxide is not harmful to human beings, nor in the manufacture of salt is it retained in the final product in harmful quantity.

In the case of brines containing small quantities of magnesium chloride, such as oil well and salt well brines, it is sufficient to add enough calcium hydroxide or lime, to convert the magnesium chloride into magnesium hydroxide, according to the equation:

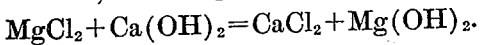

$$MgCl_2 + Ca(OH)_2 = CaCl_2 + Mg(OH)_2.$$

Any excess of magnesium hydroxide over the amount required to inhibit corrosion may be settled off if desired, but if not so settled off, is not detrimental to inhibitory action.

In my process for recovering salts from brines, as disclosed in my above mentioned application, a solution of sodium chloride, containing dissolved calcium chloride and perhaps other salts, is circulated through a surface condenser for utilizing normally wasted latent heat from condensing fluids and subsequently evaporated as a unit in the atmosphere. I have found that the corrosive effect of the circulating brines can be largely inhibited in this process by maintaining a magnesium content in such brines in excess of its solubility therein. Similarly my method of inhibiting corrosion is applicable in the case of oil wells pumping large quantities of brines and to any situation where brine or salt solutions come in contact with iron and steel surfaces.

I am aware that numerous details of my process may be varied throughout a wide range without departing from the spirit of my invention, and therefore do not purpose to limit my invention otherwise than as necessitated by the prior art.

What is claimed is:

1. A method of substantially inhibiting the corrosive effect of brines and salt solutions toward iron and steel, which comprises creating in said brines and salt solutions a magnesium hydroxide content in excess of its solubility therein and maintaining a slight excess of magnesium hydroxide during the period of contact of said brines and salt solutions with iron and steel.

2. A method of substantially inhibiting the corrosive effect of brines and salt solutions toward iron and steel, which comprises adding to said brines and salt solutions an amount of magnesium hydroxide in slight excess of its solubility therein and allowing the undissolved magnesium hydroxide to remain in suspension during the period of contact of said brines and salt solutions with iron and steel.

3. In the process of recovering salts from brines using iron or steel apparatus, the steps of creating and maintaining in said brines a sufficient magnesium hydroxide content in excess of its solubility therein to inhibit the normally corrosive effect of such brines toward the iron or steel apparatus with which said brines are in contact.

4. In the process of recovering salts from brines using iron or steel apparatus, the steps of creating and maintaining in said brines a sufficient magnesium hydroxide content to substantially prevent corrosion of the iron or steel apparatus, said magnesium hydroxide content being less than 0.05 percent.

In testimony whereof I hereunto affix my signature.

OTTO V. MARTIN.